United States Patent
Kim

(10) Patent No.: US 7,245,944 B2
(45) Date of Patent: Jul. 17, 2007

(54) METHOD OF STORING CALLER ID IN MOBILE COMMUNICATION TERMINAL

(75) Inventor: Sun Kyung Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 80 days.

(21) Appl. No.: 11/100,178

(22) Filed: Apr. 6, 2005

(65) Prior Publication Data

US 2006/0009203 A1   Jan. 12, 2006

(30) Foreign Application Priority Data

Jul. 6, 2004   (KR) ................... 10-2004-0052187

(51) Int. Cl.
*H04M 1/00*   (2006.01)
(52) U.S. Cl. .................. 455/567; 455/412.1; 455/415; 455/418; 455/566; 455/70; 455/574
(58) Field of Classification Search ............... 455/566, 455/567, 70, 412.1, 412.2, 414.1, 415, 418; 379/130, 142.14
See application file for complete search history.

(56) References Cited

U.S. PATENT DOCUMENTS

| | | | |
|---|---|---|---|
| 5,742,669 A * | 4/1998 | Lim | 379/130 |
| 6,751,485 B2 * | 6/2004 | Ranta | 455/567 |
| 6,882,714 B2 * | 4/2005 | Mansfield | 379/142.14 |
| 6,882,828 B1 * | 4/2005 | Kregel | 455/70 |
| 7,035,674 B1 * | 4/2006 | Holder et al. | 455/566 |

FOREIGN PATENT DOCUMENTS

| | | |
|---|---|---|
| JP | 08-204811 | 8/1996 |
| JP | 2001-251686 | * 9/2001 |
| KR | 1998-051986 | 9/1998 |
| KR | 10/200-0044486 | 7/2000 |
| KR | 1020010047407 | 6/2001 |

* cited by examiner

*Primary Examiner*—Steve M. D'Agosta
(74) *Attorney, Agent, or Firm*—Ohlandt, Greeley, Ruggiero & Perle, L.L.P.

(57) ABSTRACT

Disclosed is a method of storing a caller ID in a mobile communication terminal that may store the caller ID in a missed call list even when a battery is removed under state that an incoming call is being received.

The method comprises: storing in a non-volatile memory a caller ID of an incoming call and information on time at which the incoming call is received; keep storing the caller ID of the incoming call and the information on the time in the non-volatile memory, if a battery is removed from the mobile communication terminal under state the incoming call is being received; and storing the caller ID of the incoming call and the information on the time in an appropriate caller ID list depending on whether recipient of the mobile communication terminal responds to the incoming call or not.

2 Claims, 3 Drawing Sheets

METHOD OF STORING CALLER ID IN MOBILE COMMUNICATION TERMINAL

CROSS-REFERENCE TO RELATED APPLICATION

The present application is claiming priority of Korean Patent Application No. 10-2004-0052187, filed on Jul. 6, 2004, the content of which is incorporated herein by reference.

BACKGROUND OF THE INVENTION

1. Field of The Invention

The present invention relates to a method of storing a caller ID (a phone number of a caller) in a mobile communication terminal. More particularly, the present invention relates to a method of storing a caller ID in a mobile communication terminal that may store the caller ID in a missed call list even when a battery is removed under state that an incoming call is being received.

2. Description of The Related Art

When a user of a mobile communication terminal provided with a caller identification service does not respond to an incoming call, the mobile communication terminal stores a time at which the call is received and a phone number of a caller in a missed call list and displays a message, which informs the user of the missed call, on a LCD screen, so that the user can recognize the missed call.

Users often remove a battery of their mobile communication terminal under situations such as a meeting etc. difficult to answer an incoming call. In those cases, no information associated with the missed call such as a caller ID is stored, unlike FIG. 1.

Specifically, the mobile communication terminal which the incoming call is coming in stores the caller ID in a temporary memory and displays it.

There is no voltage left enough to store the caller ID as information associated with missed call in the mobile communication terminal when the battery is removed from the mobile communication terminal which the incoming call is coming in, so that the caller ID is not stored in the mobile communication terminal any more.

Like this, according to the related art, since the caller ID is stored in the missed call list simply depending on whether the user of the mobile communication terminal has responded to the incoming call or not, it is impossible to know information associated with the missed call when the battery is removed from the mobile communication terminal which the incoming call is coming in.

SUMMARY OF THE INVENTION

Accordingly, the present invention has been made to solve the above-mentioned problems occurring in the related art. The object of the present invention is to provide a method of storing a caller ID in a mobile communication terminal, which is capable of storing the caller ID in a missed call list even when a battery is removed from the mobile communication terminal which the incoming call is coming in, by storing the caller ID in a missed call list upon the incoming call, by deleting the caller ID from the missed call list in case of responding to the incoming call and by maintaining the caller ID in the missed call list in case of not responding to the incoming call.

There is provided a method of storing a caller ID in a mobile communication terminal comprising: storing in a non-volatile memory a caller ID of an incoming call and information on time at which the incoming call is received; keep storing the caller ID of the incoming call and the information on the time in the non-volatile memory, if a battery is removed from the mobile communication terminal under state the incoming call is being received; and storing the caller ID of the incoming call and the information on the time in an appropriate caller ID list depending on whether recipient of the mobile communication terminal responds to the incoming call or not.

Preferably, the caller ID of the incoming call and the information on the time may be stored in a missed call list of the non-volatile memory.

Preferably, the act of storing the caller ID of the incoming call and the information on the time in the appropriate caller ID list may comprise: judging whether the recipient responds to the incoming call or not; in a case where the recipient has responded to the incoming call, deleting the caller ID of the incoming call and the information on the time from a missed call list of the non-volatile memory and storing the caller ID of the incoming call and the information on the time in a received call ID list of the non-volatile memory; and in a case where the recipient has not responded to the incoming call, keep storing the caller ID of the incoming call and the information on the time in the missed call list.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
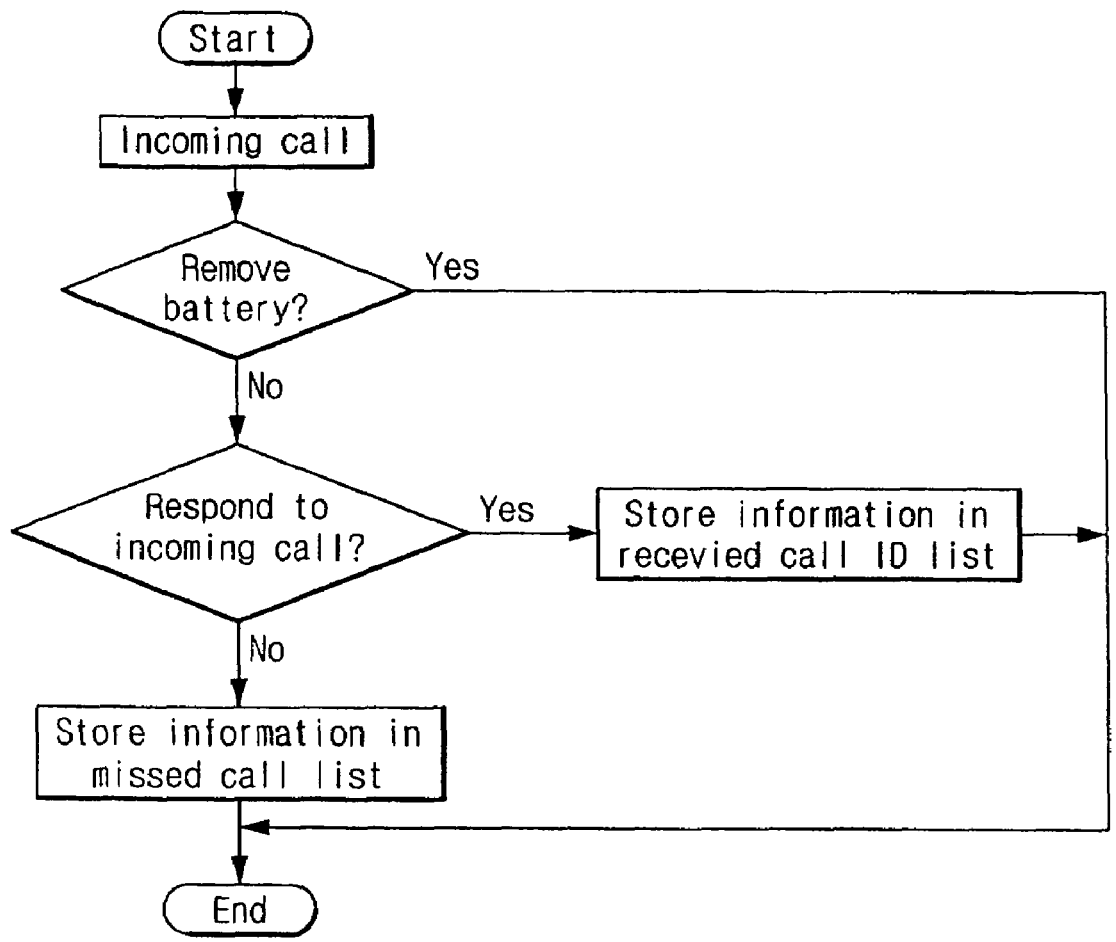
FIG. 1 is a flow chart for illustrating a method of storing a caller ID in a mobile communication terminal according to the related art.
Figure 2:
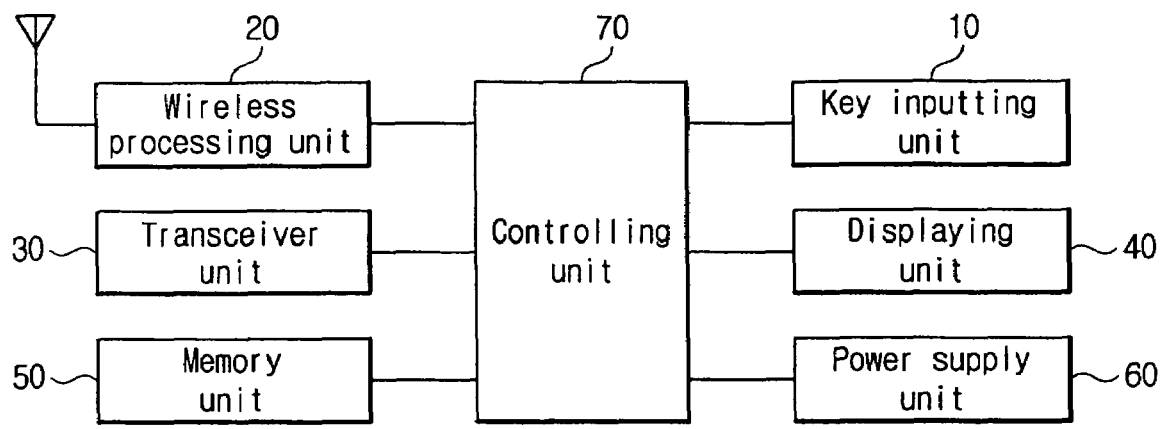
FIG. 2 shows configuration of a mobile communication terminal in which a method of storing a caller ID according to an embodiment of the present invention is embodied.

FIG. 2 shows configuration of a mobile communication terminal in which a method of storing a caller ID according to an embodiment of the present invention is embodied. The mobile communication terminal comprises a key inputting unit 10, a wireless processing unit 20, a transceiver unit 30, a displaying unit 40, a memory unit 50, a controlling unit 70 and a power supply unit 60.

The key inputting unit 10 generates key codes for inputting a phone number required for a dialing and diverse setting values.

The wireless processing unit 20 transmits and receives data to and from a mobile communication system (not shown) using power applied from the power supply unit 60.

The transceiver unit 30 inputs/outputs a voice so that a user can speak over the telephone.

The displaying unit 40 displays diverse states of the mobile communication terminal, information provided by the mobile communication terminal, a character message received via the mobile communication system and characters and numbers inputted from the key inputting unit 10.

The memory unit 50 stores a system operating program, a program and diverse data for embodying a caller ID storing method according to the present invention, an received call ID list and a missed call list, etc. There are the missed call list and the received call ID list in the memory unit 50. The received call ID list stores a caller ID and information on time at which an incoming call is received. The missed call list stores a caller ID and information on the time, in a case where the user does not respond to an incoming call. At this time, the missed call list and the received call ID list are stored in a non-volatile memory, so that the previously stored information is not lost even when the power supply to the mobile communication terminal is interrupted.

The controlling unit 70 controls overall operations of the mobile communication terminal, and the power supply unit 60 supplies power to the entire system through the controlling unit 70.

Figure 3:
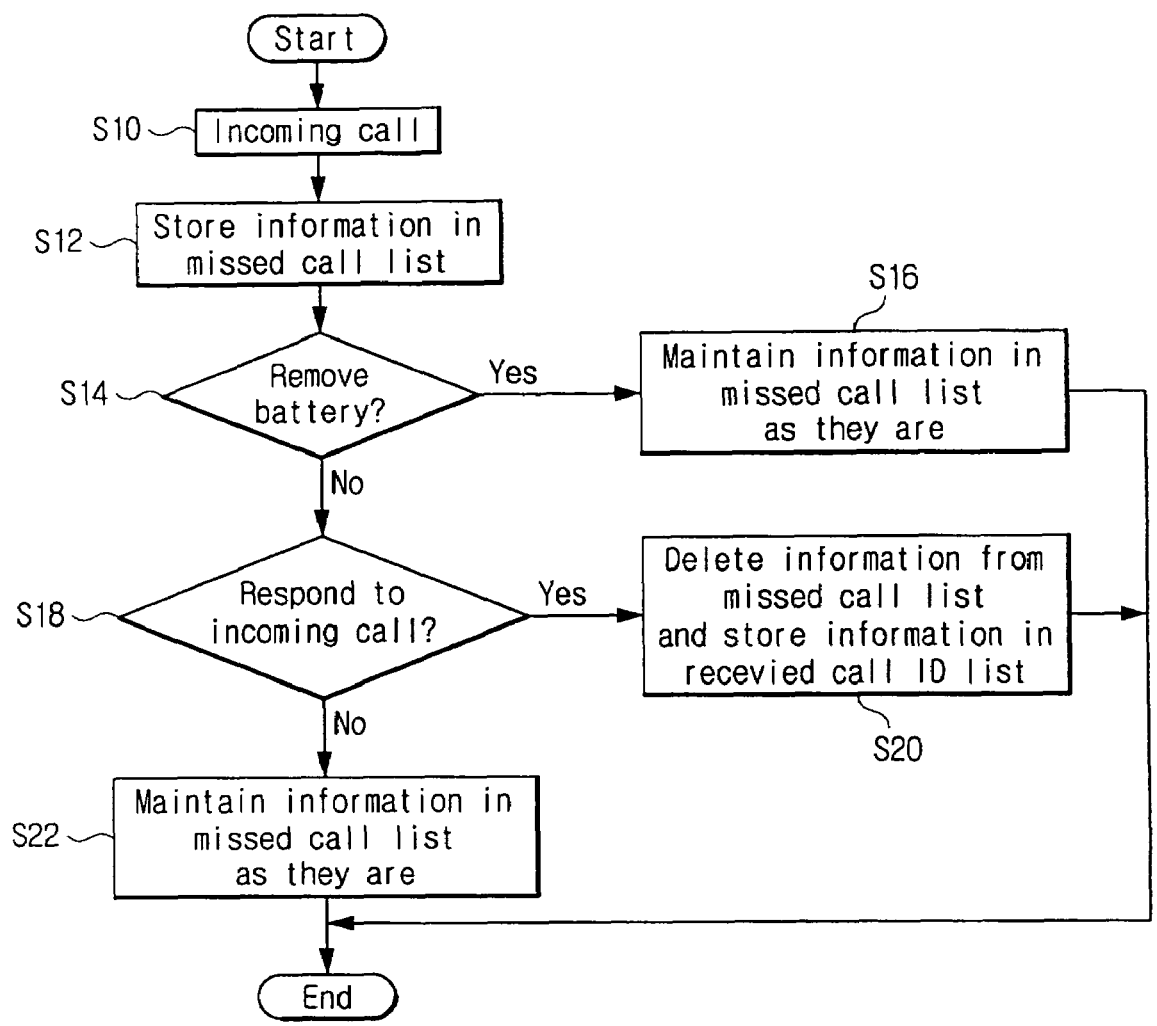
FIG. 3 is a flow chart for illustrating a method of storing a caller ID in a mobile communication terminal according to an embodiment of the present invention.

FIG. 3 is a flow chart for illustrating a method of storing a caller ID in a mobile communication terminal according to an embodiment of the present invention.

First, when a incoming call is received at the mobile communication terminal (S10), the controlling unit 70 of the mobile communication terminal displays a caller ID of the incoming call on a LCD screen and stores caller ID and a time at which the incoming call is received in the missed call list of the non-volatile memory at the same time (S12).

After that, whether a battery is removed from a main body of the mobile communication terminal which the incoming call is coming in, is judged (S14).

If the battery is removed under state that the incoming call is being received, the phone number of the caller (i.e. the caller ID) and information on the time at which the call is received are maintained in the missed call list as they are (S16).

In contrast, if the battery is not removed under state that the incoming call is being received, whether the recipient responds to the incoming call or not is judged (S18).

As a judgment result of the S18, if the recipient responds to the incoming call, the caller ID and information on the time at which the call is received are deleted from the missed call list, and the caller ID and information on the time at which the call is received are stored in the received call ID list (S20).

In contrast, as the judgment result of the S18, if the recipient does not respond to the incoming call, the caller ID and information on the time are maintained in the missed call list as they are (S22).

In this specification, specific description on configuration for a judgment regarding whether a power supply to the mobile communication terminal is interrupted or not (a judgment regarding whether the battery is removed from the mobile communication terminal or not), and configuration for transfer information associated with the incoming call from the missed call list to the received call list in a case where the recipient responds to the incoming call, is omitted. However, the skilled in the art will be able to embody the present invention based on the above descriptions without a difficulty.

As described above, according to the present invention, at the moment the call is received, the caller ID is stored in the missed call list. Then, in a case where the recipient responds to the incoming call, the caller ID is deleted from the missed call list. In a case where the recipient does not respond to the incoming call, the caller ID is maintained in the missed call list. Accordingly, it is possible to store the caller ID in the missed call list even when the battery is removed from the mobile communication terminal which the incoming call is coming in. Therefore, the recipient can make a phone call using the caller ID stored in the missed call list when the recipient wishes to do so.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of storing a caller ID in a mobile communication terminal comprising:
   storing in a non-volatile memory a caller ID of an incoming call and information on time at which the incoming call is received;
   keep storing the caller ID of the incoming call and the information on the time in the non-volatile memory, if a battery is removed from the mobile communication terminal while the incoming call is being received;
   judging whether the recipient responds to the incoming call or not;
   in a case where the recipient has responded to the incoming call, deleting the caller ID of the incoming call and the information on the time from a missed call list of the non-volatile memory and storing the caller ID of the incoming call and the information on the time in a received call ID list of the non-volatile memory; and
   in a case where the recipient has not responded to the incoming call, keep storing the caller ID of the incoming call and the information on the time in the missed call list.

2. The method according to claim 1, wherein the caller ID of the incoming call and the information on the time are stored in a missed call list of the non-volatile memory.

* * * * *